Patented Jan. 29, 1952

2,584,091

UNITED STATES PATENT OFFICE 2,584,091

STEROID 6-ACETIC ACIDS

Emil Kaiser and Jerry Svarz, Chicago, Ill., assignors to Armour and Company, Chicago, Ill., a corporation of Illinois No Drawing. Application May 8, 1948, Serial No. 26,002

18 Claims. (Cl. 260—397.1)

This invention relates to cyclopentanoperhydrophenanthrene compounds of the i-form having attached at their 6-position an acetic acid group, and to acid rearrangement derivatives thereof.

In a previous patent application, Serial No. 577,932, now abandoned, we described the method of forming a mixture of isomeric cholesterol malonic esters and acids. According to this method organic sulfonic esters of cholesterol are reacted with

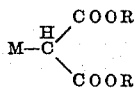

where M is a metal, and the reaction product is shown to be an isomeric mixture of cholesterol malonic esters. By saponification of the ester mixture, a mixture of acids is obtained which can be separated into a petroleum ether insoluble fraction (Fraction A) and a petroleum ether soluble fraction (Fraction B).

In our co-pending application, Serial No. 729,882, now Patent No. 2,520,726, we have described Fraction B as a mixture which can itself be separated into different fractions. A first fraction can be crystallized from a solution of Fraction B in methanol, and from the mother liquor of the methanol crystallization, a second fraction may be isolated in crystalline form. This second fraction is i-cholesterylmalonic acid. Methods of preparing this acid and its ester and amide derivatives are described in said application, Serial No. 729,882.

We have now found that cyclopentanoperhydrophenanthrene compounds in general are adaptable for use in the processes described above and that it is possible to produce, for example, i-stigmasteryl-malonic acid, i-sitosterylmalonic acid, i-sitosterylmalonic acid esters, i-stigmasterylmalonamide, and the like. Such compounds may be described as cyclopentanoperhydrophenanthrene compounds of the i-form having attached at their 6-position a malonic acid group, or a malonic acid ester group, or a malonamide group, etc.

We have found further that the above malonic acid compounds may be treated to produce, as new compositions of matter, cyclopentanoperhydrophenanthrene compounds of the i-form, having attached at their 6-position an acetic acid group. Such treatment comprises (1) decarboxylation at elevated temperatures in high vacuum; or (2) decarboxylation by conversion to the amide through use of thionyl chloride and ammonia, followed by saponification of the amide with an alkaline glycol.

The following equations are illustrative of the two reactions, where the cyclopentanoperhydrophenanthrene compound is a cholesterol derivative:

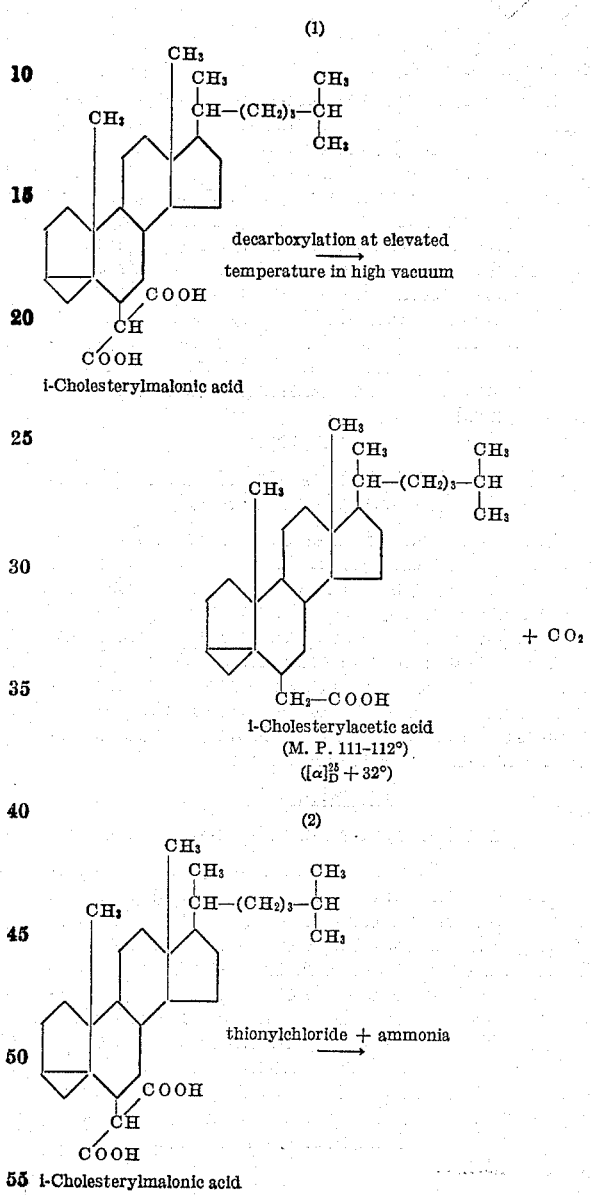

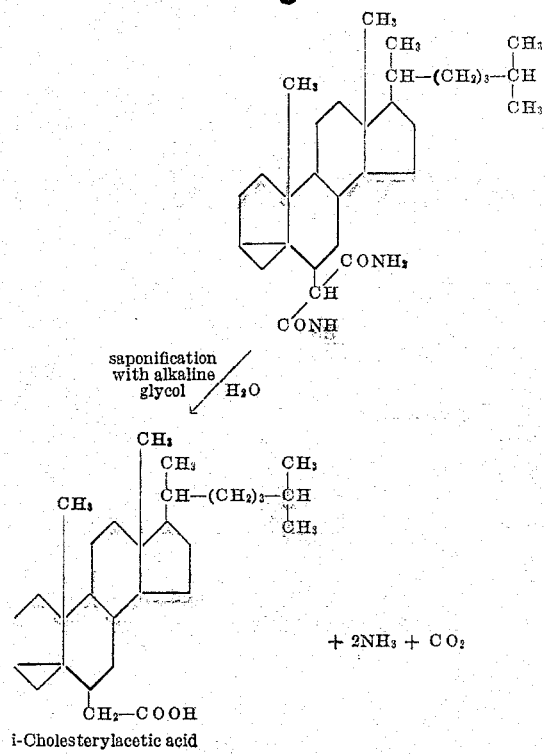

i-Cholesterylacetic acid

If, in the above reactions, i-sitosterylmalonic acid is the starting compound, the resulting product will be i-sitosterylacetic acid; if i-stigmasterylmalonic acid is used, i-stigmasterylacetic acid will result; and so on. In each case, the resulting product is a cyclopentanoperhydrophenanthrene compound of the i-form having attached at its 6-position an acetic acid group.

These new compounds are useful as intermediates in the preparation of hormones, vitamins and other pharmaceutical compositions having physiological properties. The following examples serve to illustrate the manner in which they may be prepared.

EXAMPLE I

*Preparation of i-cholesterylacetic acid from i-cholesterylmalonic acid*

In a 500 cc. flask immersed in an oil bath, heat 10 g. of i-cholesterylmalonic acid in a vacuum maintained by a mercury vapor pump. Raise the temperature slowly to 175° and keep it there for 10 minutes. Then slowly raise the temperature again to 200° and continue heating for 10 more minutes. After that, cool the flask to room temperature and crystallize the reaction product from acetone. Recrystallize from acetone to obtain the i-cholesterylacetic acid.

EXAMPLE II

*Preparation of i-stigmasterylmalonamide*

In 10 cc. of thionylchloride, suspend 5 g. of i-stigmasterylmalonic acid and keep the mixture at room temperature for two hours. Bring the material which is still undissolved into solution by heating on the steam bath for 10 minutes.

Distill off the excess thionylchloride under reduced pressure and take up the crude acid chloride in 75 cc. of absolute ether. Filter the ether solution and pass dry ammonia gas into the filtrate for 70 minutes. Remove the ether and wash the residue with water. After drying in vacuo, crystallize the i-stigmasterylmalonamide from ethyl acetate.

EXAMPLE III

*Saponification of i-stigmasterylmalonamide*

Dissolve 20 g. of potassium hydroxide by warming in 100 cc. of propylene glycol. Add 7 g. of i-stigmasterylmalonamide and reflux the mixture for 10 hours. Saponification of the amide will be indicated by the evolution of ammonia during the heating. Dilute the clear propylene glycol solution with water, filter, and acidify with hydrochloric acid. Extract the resulting precipitate with ether. Evaporate the ether solution, dissolve the residue in methanol, and treat the solution with charcoal. After filtration and chilling, needles will be obtained which may be twice recrystallized from methanol. The resulting product is i-stigmasterylacetic acid.

We have found further that the cyclopentanoperhydrophenanthrene compounds of the i-form, having a malonamide or an acetic acid group attached at their 6-position, may be treated with a mineral acid whereby to effect rearrangement and produce, as new compositions of matter, unsaturated cyclopentanoperhydrophenanthrene compounds having an acetic acid group attached at their 6-position and also cyclopentanoperhydrophenanthrene compounds in which the carbon atoms occupying the 5- and 6-positions form part of a lactone ring.

Thus, for example, i-cholesterylacetic acid may be dissolved in glacial acetic acid and treated with concentrated sulfuric acid. The precipitate which forms when this reaction mixture is poured into a sodium chloride solution is a new rearrangement product, cholestene-6-acetic acid, which has the structural formula:

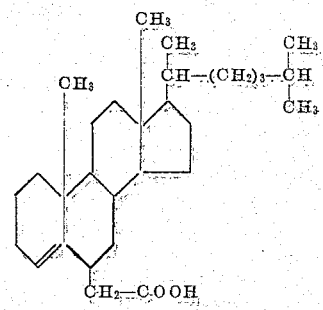

Cholestene-6-acetic acid (M. P. 173–174° $[\alpha]_D^{25} + 46°$)

The mother liquor remaining after separation of the cholestene-6-acetic acid contains a neutral, lactone ring-containing product which is also new and which has the structural formula:

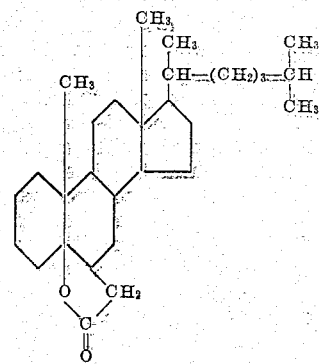

(M. P. 108–109°)
($[\alpha]_D^{25} + 80.5°$)

Similarly, when i-cholesterylmalonamide, for example, is dissolved in glacial acetic acid and treated with concentrated sulfuric acid, a precipitate is obtained. A methanol solution of this precipitate may be cooled to deposit a rearrangement product which is the same cholestene-6-acetic acid, the structure of which is pictured above. The mother liquor remaining after separation of the cholestene-6-acetic acid contains the same neutral, lactone ring-containing product, the structure of which is also pictured above.

Any mineral acid may be used in bringing about rearrangement. Examples of such acids are sulfuric acid, phosphoric acid, nitric acid, and the like.

By application of the foregoing procedures, the new rearrangement products comprising unsaturated cyclopentanoperhydrophenanthrene compounds having an acetic acid group attached at their 6-position and cyclopentanoperhydrophenanthrene compounds in which the carbon atoms occupying the 5- and 6-positions form part of a lactone ring may be prepared by starting with a cyclopentanoperhydrophenanthrene compound of the i-form having attached at its 6-position a malonamide group and subjecting it to treatment comprising (1) saponification with alkaline glycol, followed by acid rearrangement; or (2) acid rearrangement, followed by saponification with alkaline glycol.

These new rearrangement products are useful as intermediates in the preparation of vitamins and hormones of the progesterone type and male hormone type. The following examples serve to illustrate the manner in which they may be prepared.

EXAMPLE IV

Rearrangement of i-cholesterylacetic acid

Dissolve 4 g. of i-cholesterylacetic acid in 120 cc. of glacial acetic acid. Add 10 drops of concentrated sulfuric acid and heat the solution on the steam bath for two hours. Cool the reaction mixture and pour into one liter of 10% aqueous sodium chloride solution. Filter off the precipitate, dry, and dissolve in 20 cc. of glacial acetic acid. After filtration, keep the solution at room temperature for several days. Filter to remove the crystals which deposit. Concentrate the mother liquor to half its volume under reduced pressure to obtain a second crop of crystals. These crystals are cholestene-6-acetic acid.

After the cholestene-6-acetic acid is crystallized out from the concentrated glacial acetic acid solution, evaporate the mother liquor to dryness under reduced pressure. Dissolve the oily residue in ether and repeatedly extract with a 5% potassium hydroxide solution. The combined alkaline extracts will yield additional amounts of cholestene-6-acetic acid.

Wash the ether layer with water, dry over sodium sulfate, and evaporate the ether. The neutral, lactone ring-containing rearrangement product will crystallize in beautiful needles.

EXAMPLE V

Rearrangement of i-sitosterylmalonamide i-Sitosterylmalonamide may be prepared in a process similar to that described in Example II which relates to the preparation of i-stigmasterylmalonamide. In 200 c. c. of glacial acetic acid, dissolve 2.25 g. of the i-sitosterylmalonamide thus prepared and add 1 c. c. of concentrated sulfuric acid. Keep the mixture on the steam bath for one hour, then add 500 c. c. of water. Filter off the precipitate, wash with water, and dry. Dissolve the dry material in 15 c. c. of methanol and keep the solution at −4° for 12 hours. Filter to separate the swollen lumps which deposit. After drying, a slightly colored powder will be obtained which is soluble in ether and benzene and which may be designated as Fraction I.

Dilute the mother liquor filtered off from Fraction I with water. A white precipitate will form, which may be designated Fraction II.

EXAMPLE VI

Hydrolysis of Fraction I

Dissolve 1 g. of potassium hydroxide in 10 c. c. of propylene glycol and add 0.50 g. of Fraction I. Reflux the solution for two hours, cool and dilute with 100 c. c. water. Filter off the precipitate, wash with water, and dry. Crystallize the dry material from glacial acetic acid. Recrystallize from methanol to obtain a pure form of the rearrangement product having the following structure:

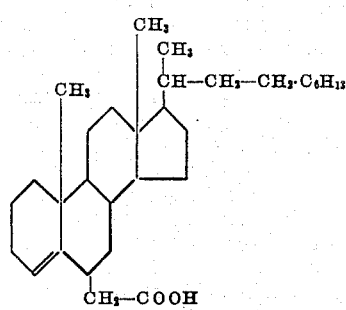

EXAMPLE VII

Hydrolysis of Fraction II

Reflux 1.5 g. of Fraction II in 25 c. c. of propylene glycol containing 2.5 g. of potassium hydroxide. After 2 hours refluxing, cool the solution, dilute with 400 c. c. of water (clear solution), and acidify. Filter off the precipitate, wash with water, and dry. Dissolve the dry material in 20 c. c. of methanol. After dilution with 100 c. c. of water, extract the mixture with petroleum ether. Evaporate the petroleum ether. Recrystallize the residue twice from methanol. The resulting needles comprise the lactone ring-containing rearrangement product having the following structure:

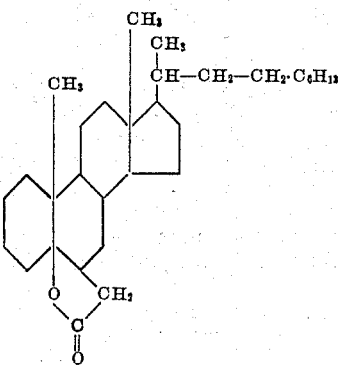

The foregoing examples indicate certain specific ways in which our improvements may be practiced, but they are given for the purpose of explanation only, and it is understood that many other specific procedures may be used, all within the spirit of the invention.

We claim:
1. A cyclopentanoperhydrophenanthrene compound having attached at its 6-position an acetic acid group.
2. Cholestene-6-acetic acid.

3. A compound having the structure

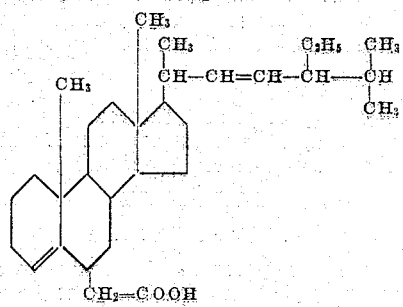

4. A cyclopentanoperhydrophenanthrene compound of the i-form having attached at its 6-position an acetic acid group.

5. i-Cholesterylacetic acid.

6. i-Stigmasterylacetic acid.

7. i-Sitosterylacetic acid.

8. A process for the production of a cyclopentanoperhydrophenanthrene compound comprising reacting with thionylchloride and ammonia a cyclopentanoperhydrophenanthrene compound of the i-form having attached at its 6-position a malonic acid group, separating from the reaction mixture the resulting malonamide, saponifying said malonamide compound with an alkaline glycol, acidifying the resulting solution, and separating from said solution a precipitate comprising a cyclopentanoperhydrophenanthrene compound of the i-form having attached at its 6-position an acetic acid group.

9. A process for the production of a cyclopentanoperhydrophenanthrene compound comprising saponifying with an alkaline glycol a cyclopentanoperhydrophenanthrene compound of the i-form having attached at its 6-position a malonamide group, acidifying the resulting solution, and separating from said solution a precipitate comprising a cyclopentanoperhydrophenanthrene compound of the i-form having attached at its 6-position an acetic acid group.

10. A process for the production of i-cholesterylacetic acid comprising reacting i-cholesterylmalonic acid with thionylchloride and ammonia, separating i-cholesterylmalonamide from the resulting reaction mixture, saponifying said i-cholesterylmalonamide with an alkaline glycol, acidifying the resulting solution, and separating i-cholesterylacetic acid in the form of a precipitate from said solution.

11. A process for producing a cyclopentanoperhydrophenanthrene compound comprising heating under reduced pressure a cyclopentanoperhydrophenanthrene compound of the i-form having attached at its 6-position a malonic acid group, cooling the reaction mixture, and separating the precipitate comprising a cyclopentanoperhydrophenanthrene compound of the i-form having an acetic acid group attached at its 6-position.

12. A process for the production of i-cholesterylacetic acid comprising heating i-cholesterylmalonic acid under reduced pressure, cooling, and separating i-cholesterylacetic acid in the form of a precipitate from the reaction mixture.

13. A process for producing an unsaturated cyclopentanoperhydrophenanthrene compound comprising treating a saturated cyclopentanoperhydrophenanthrene compound of the i-form, having attached at its 6-position an acetic acid group, with a mineral acid whereby to effect a rearrangement and treating the reaction mixture with an aqueous sodium chloride solution to produce a precipitate comprising an unsaturated cyclopentanoperhydrophenanthrene compound having attached at its 6-position an acetic acid group.

14. A process for producing an unsaturated cyclopentanoperhydrophenanthrene compound comprising placing in a reaction vessel a saturated cyclopentanoperhydrophenanthrene compound of the i-form having attached at its 6-position a malonamide group, performing the steps of acid rearrangement by use of a mineral acid and saponification by use of glycol, and separating from the reaction mixture an unsaturated cyclopentanoperhydrophenanthrene compound having an acetic acid group attached at its 6-position.

15. A process for the production of an unsaturated cyclopentanoperhydrophenanthrene compound comprising reacting with thionylchloride and ammonia a saturated cyclopentanoperhydrophenanthrene compound of the i-form having attached at its 6-position a malonic acid group, separating from the reaction mixture the resulting malonamide, treating said malonamide compound with sulfuric acid whereby to produce a rearrangement product, cooling a methanol solution of said rearrangement product until a precipitate is formed, saponifying said precipitate with an alkaline glycol solution, and separating from the reaction mixture an unsaturated cyclopentanoperhydrophenanthrene compound having attached at its 6-position an acetic acid group.

16. A process for the production of an unsaturated cyclopentanoperhydrophenanthrene compound comprising saponifying with an alkaline glycol a saturated cyclopentanoperhydrophenanthrene compound of the i-form having attached at its 6-position a malonamide group, acidifying the resulting solution, separating from said solution the resulting acetic acid compound, treating said compound with sulfuric acid whereby to effect a rearrangement, and treating the reaction mixture with an aqueous sodium chloride solution to produce a precipitate comprising an unsaturated cyclopentanoperhydrophenanthrene compound having attached at its 6-position an acetic acid group.

17. A process for the production of cholestene-6-acetic acid comprising treating i-cholesterylmalonamide with sulfuric acid whereby to produce a rearrangement product, cooling a methanol solution of said rearrangement product until a precipitate is formed saponifying said precipitate with an alkaline glycol solution, and separating cholestene-6-acetic acid from the reaction mixture.

18. A process for the production of cholestene-6-acetic acid comprising saponifying i-cholesterylmalonamide with an alkaline glycol, acidifying the resulting solution, separating i-cholesterylacetic acid in the form of a precipitate from said solution, treating said i-cholesterylacetic acid with sulfuric acid whereby to effect a rearrangement, and treating the reaction mixture with an aqueous sodium chloride solution to produce cholestene-6-acetic acid in the form of a precipitate.

EMIL KAISER.
JERRY SVARZ.

No references cited.